Oct. 30, 1923.
W. C. READ
1,472,090
MECHANICAL MOVEMENT
Filed March 23, 1921      2 Sheets-Sheet 1
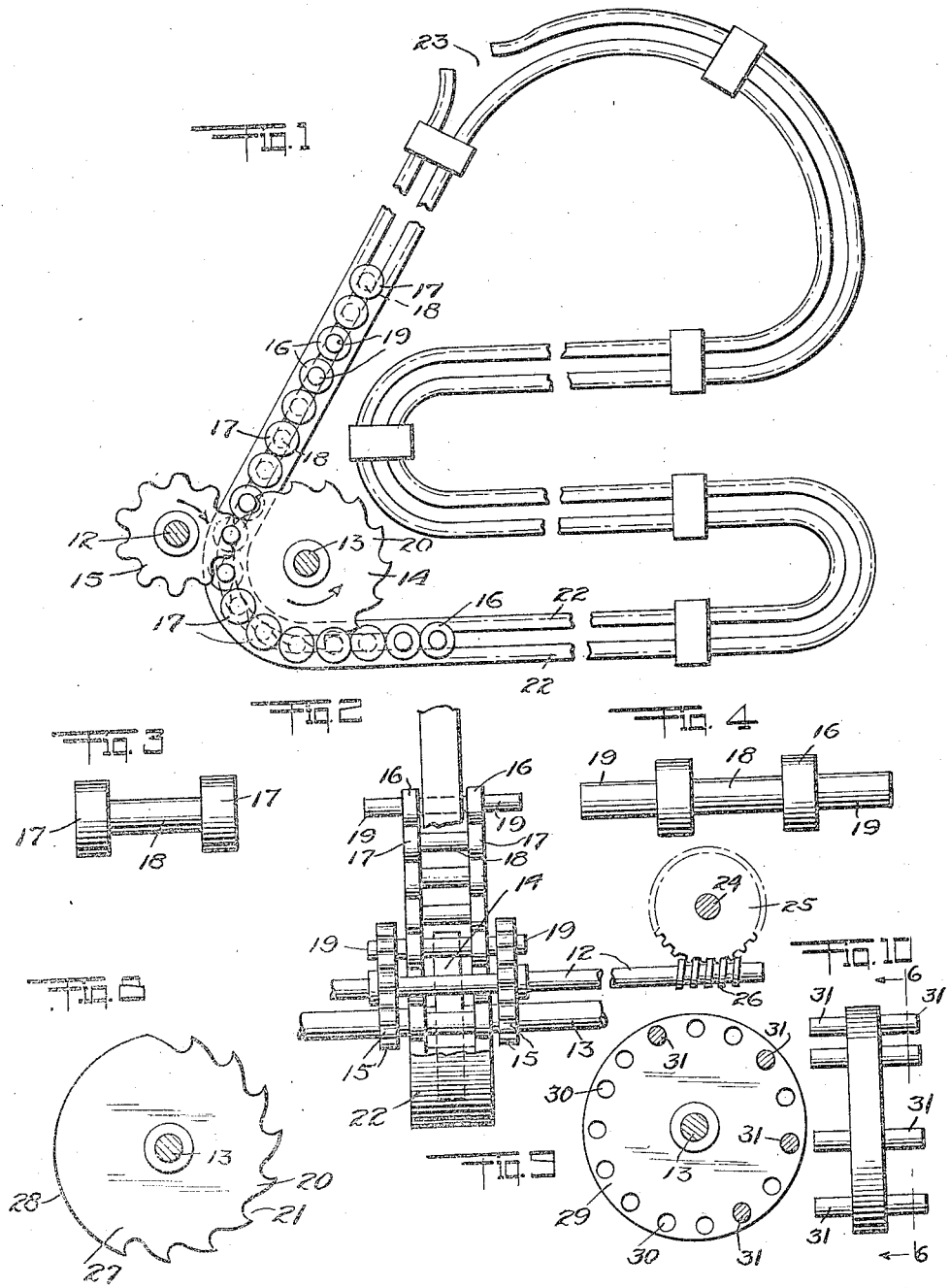
INVENTOR
Walter C. Read
BY
ATTORNEY

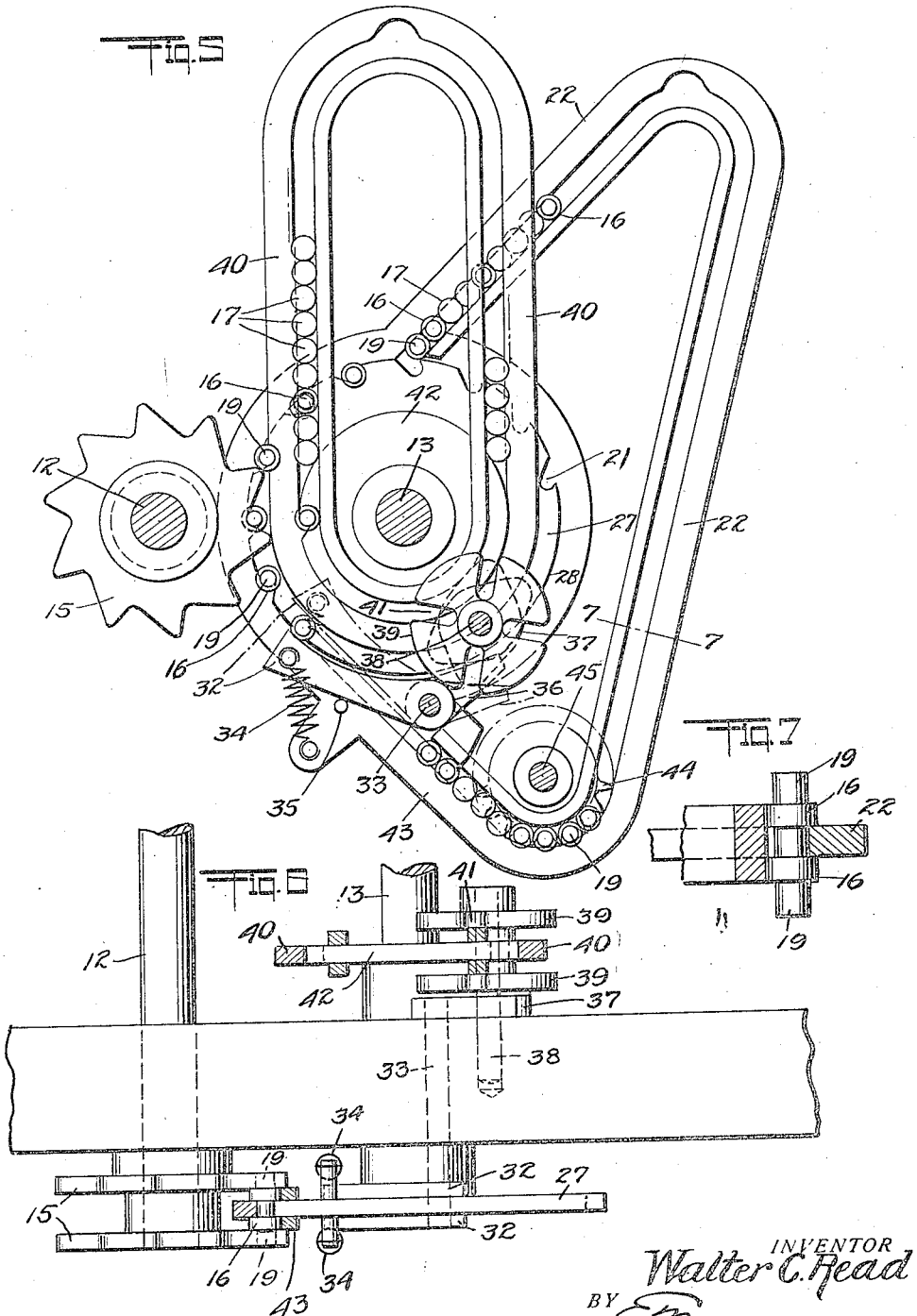

Patented Oct. 30, 1923.

1,472,090

UNITED STATES PATENT OFFICE.

WALTER C. READ, OF BLOOMFIELD, NEW JERSEY.

MECHANICAL MOVEMENT.

Application filed March 23, 1921. Serial No. 454,624.

*To all whom it may concern:*

Be it known that I, WALTER C. READ, a citizen of the United States, and a resident of Bloomfield, in the county of Essex and State of New Jersey, have invented certain new and useful Improvements in a Mechanical Movement, of which the following is a full, clear, and exact description.

Among the principal objects which the present invention has in view are: to vary, at will, the transmitted speed of a power-driven shaft; to change the variations in the transmission quickly and readily; to obtain a large variety of speeds with a mechanism condensed in bulk; to obtain a number of variations in the driven speed of rotation greater than the structure of the driving member; and to vary the operative movements of the driving mechanism.

Drawings.

Figure 1 is a side view of a mechanical movement constructed and arranged in accordance with the present invention.

Figure 2 is a front view of the same showing a portion of the belt, track and rollers forming the same, and the driving and driven wheel connected with the driving and driven shafts and transmission mechanism connected therewith.

Figure 3 is a side view of one of the spacing members of the driving belt.

Figure 4 is a side view of one of the driving rollers with which the belt is provided.

Figure 5 is a side elevation showing a mechanical movement constructed and arranged in accordance with the modified form of the invention.

Figure 6 is a top plan view thereof, the view being shown in its projected relation to Fig. 5.

Figure 7 is a cross section on enlarged scale of the track construction, the section being taken as on the line 7—7 in Fig. 5.

Figure 8 is a side view of a driving sprocket constructed in accordance with the modified form of the invention.

Figure 9 is a vertical section taken on the line 6—6 in the modified form of the invention.

Figure 10 is an edge view of the modified form shown in Fig. 6.

Description.

In the present invention motion is imparted to the driven shaft 12 from the driving shaft 13 through the spur wheel 14, the sprocket 15, and a driving belt which embodies a series of driving rollers 16 and spacing rollers 17. Both rollers are of dumb-bell shape having enlarged disks spaced apart by a connector bar 18. The driving rollers 16 differ from the spacing rollers 17 by having extended trunnions 19 which engage the sprocket wheels 15 entering between the teeth thereof. The rollers 16 and 17 are engaged equally by the teeth 20 of the spur wheel 14.

The teeth 20 are of a shape that may be termed "saw toothed shaped" to form flaring pockets 21 that fit over the bars 18 to move the various rollers forward seriatim and into engagement with the teeth of the sprockets 15 as shown best in Fig. 2 of the drawings, when the rollers are equipped with the extended trunnions 19.

The belt constituted by the rollers 16 and 17 may be of any suitable length and may comprise any suitable number of rollers 16 and 17. When not engaged by the wheels 14 and 15 the said rollers 16 and 17 are supported by a skeleton track, the sides whereof are parallel, spaced apart and disposed between the flanged sides of the said rollers. As indicated in Fig. 1 of the drawings the racks may be looped and curved to save the space occupied thereby. It will, of course, be understood that the rollers 16 and 17 are arranged to form an approximately continuous belt so that at all times in the operation of the parts of the said movement the rollers will pass between the wheels 14 and 15, whether the wheels 15 be engaged by the trunnions 19 or not. In some constructions I provide a gateway 23 in the tracks 22 wherethrough rollers may be removed from the belt or inserted into the belt to vary the resultant movement of the wheels 15 and shaft 12.

In Fig. 2 of the drawings a shaft 24 is shown as provided with a worm wheel 25, the teeth whereof engage a worm section 26 on the shaft 12. The engagement between the worm wheel 25 and the worm section 26 is such as to reduce the speed transmitted from the shaft 12 to the shaft 24, and at the same time to prevent any backlash or retrogressive movement of the shaft 12 and sprocket 15 thereon, thus always preserving the rotation of the wheels 15 with the belt.

Figures 5 to 8 inclusive show a modified form of the invention, the modification being designed to amplify the transmission combinations and to reduce the space occupied by the structure. To this end means is provided repeating the combination of the driving element in relation to the driven element. The means consists primarily in providing the driving pinion 27 with a limited series of pockets 21 and a dwell 28. In the operation of the pinion 27, the pockets 21 extract from the short upper section of the track 22, one of the rollers 16 or 17 as the case may be in accordance with the arrangement of the said rollers. When the dwell 28 is interposed between the discharge opening of the track 22, the column of rollers is suspended in the track until the said dwell passes from before the said opening and the pockets 21 again align therewith.

It is obvious that if it is desired to repeat any particular series of said rollers 16 and 17, for action on the sprockets 15, this can be effected by preventing the said rollers, which fill the said pockets, from leaving the same. This is the office of the switch 32.

The switch 32 is pivotally mounted on the shaft 33 on the frame of the track 22. The switch is normally held by a pull spring 34 in the position shown by full lines in Fig. 5, where it is arrested by the stop pin. The tail piece 36 with which the switch is provided rests in the path of the double ended cam 37 mounted rigidly on the shaft 38, whereon are held the Geneva wheels 37.

A supplemental track 40 of practically the same construction as the track 22 is provided with a complement of rollers 16 and 17. The trunnions 19 of the rollers 16 enter the radial slots of the Geneva wheels 39 whenever moved thereto by the single toothed disk 42. The disk 42 is driven by the shaft 13 with the wheel 27. The perimeter of the wheel 42 operates to suspend the columns of rollers at the opposite sides of the center of the said wheels and shaft 13. The trunnions 19 operate upon the Geneva wheels 39 in the manner usual to such wheels, that is to effect a rapid revolution of the wheels when operated by the driving mechanism or the trunnions 19.

From the foregoing it will be seen that by placing the rollers 16 in a predetermined relative disposition the Geneva wheels 39 may be operated at variable intervals, said intervals being determined by the number of rollers 17 interposed between the rollers 16 and the columns held in the track 40.

With each movement of the Geneva wheels 39, the cam 37 is disposed to either permit the spring 34 to contract or to expand the same with the effect that the switch 32 is placed in the position shown by full lines or in the position shown by the broken lines in Fig. 5 of the drawings. Whenever the switch is disposed in the position shown by the full lines the rollers held in the wheel 27 will remain in the said wheel and repeat their effect on the wheels 15 and the shaft 12.

Whenever the Geneva wheels 39 are engaged to rotate the shaft 38 so that the cam 37 lifts the forward end of the switch 32, the rollers 16 and 17 held by the teeth of the wheel 27 are permitted to escape therefrom as the same come under the switch 32 which now operates to strip the said rollers from the said wheel 27 and to deliver the same into the lower extension 43 of the track 22. When now the pockets 21 pass under the delivery end of the track 22 at the upper side of the wheel 27, the rollers contained in the said track pass into the said pockets to operate on the wheels 15 and shaft 12, in accordance with the designed arrangement of the rollers 16 and 17 in the track 22. If the cam 37 is not immediately changed, the rollers 16 and 17 will pass from the wheel 27 as the same are delivered into the lower extension 43 of the track 22. If, however, the wheels 39 are engaged, and the cam 37 is again shifted the spring 34 retracts the switch 32 to the position where the combination of the rollers 16 and 17 in the wheel 27 remains constant, which combination will be repeated in its effect on the wheels 15 and the shaft 12 until the switch 32 is again shifted.

It is obvious that by means of this arrangement there is obviated the necessity for carrying a larger number of rollers 16 and 17 in the belt operating with the wheel 27 to intermittently drive the shaft 12, and for the reason that in practice it is thought that a great number of the combinations are repeated a number of times.

At the lower end of the extension 43 a sprocket wheel 44 is provided, which engages the various rollers 16 and 17 to drive the same up the inclined extension of the track 22. The shaft 45 with which the said wheel is connected is usually operatively connected with the shaft 13 to secure correspondence in action between the wheels 44 and the wheel 27.

In Figure 8 of the drawings a modified form is shown wherein a driving pinion 27 is employed which is provided with a peripheral dwell 28, the curve of the surface whereof is coincident with the outer edges or tips of the teeth 20. It will be understood that when the dwell 28 engages any of the bars 18 of the rollers 16, the rollers 16 are held suspended in the track 22. When using this form of driving pinion the spacing rollers 17 are not employed, the dwell 28 being calculated to take the place of and produce the pauses in the operation in the transmission which otherwise would be the function of the rollers 17.

In Figure 9 of the drawings a further modified form of the invention is shown wherein a disk-like driving member 29 is furnished with a series of perforations 30 for receiving pins 31. When the pins 31 engage the sprockets 15, entering as they do between the teeth thereof, the said sprocket and the shaft 12 connected therewith are driven. It will be understood that the pins 31 may be removed and replaced in accordance with any design desired by the person in charge.

From the foregoing, it will be seen that when employing the preferred form of the invention such as shown in Figures 1 and 2, the rollers 16 having the trunnions 19 may be grouped in accordance with the length of continuous movement, it is desired to impart to the shaft 12, that is to say, if a movement of the shaft 12 equivalent to the movement of the wheels 15 over a space corresponding with two of the teeth thereof, this is accomplished by placing two of the rollers 16 in juxtaposed relation in the driving belt. If then it is desired that the shaft 12 should rest through a period corresponding with the continuous movement of three of the teeth of the wheels 15, this is accomplished by placing three of the rollers 17 in the belt. If next a group of three or four of the rollers 16 be inserted, the shaft 12 will be rotated in accordance with the engagement in successive order of the said teeth by the said trunnions.

It is also evident that commensurate with the number of rollers employed, a plan of operation or of transmission of the shaft 12 may be set up which would be impossible with any construction employing mutilated or straight gears.

Claims.

1. A mechanical movement comprising a rotating driving member; a driven member to move in unison with said driving member when engaged therewith; a plurality of detached complementary members adapted for addition to said driving member at will without interruption of said driving member, said complementary members being adapted to engage said driven member for operatively connecting the same with said driving member; and means for regulating the supply of said complementary members to said driving member, said means embodying a plurality of spacing devices for interposition between said complementary devices, said spacing members being adapted to pass said driven member without engaging the same.

2. A mechanical movement comprising a rotating driving member; a driven member to move in unison with said driving member when engaged therewith; and a plurality of detached complementary members adapted for addition to said driving member at will, without interruption of said driving member, said complementary members being adapted to engage said driven member for operatively connecting the same with said driving member, said complementary members having spacing devices, the dimensions whereof correspond with the structure of the driving member.

3. A mechanical movement comprising a driving wheel having a geared toothed driven wheel; a plurality of detached complementary devices for operatively connecting said wheels at variable intervals, said devices having sections for engaging said wheels separately.

4. A mechanical movement comprising a driving wheel having a geared toothed driven wheel; a plurality of detached complementary devices for operatively connecting said wheels at variable intervals, said devices having sections for engaging said wheels separately; and a plurality of independent spacing devices for feeding said complementary members to said wheels in spaced relation to register with said wheels.

5. A mechanical movement comprising a driving wheel having a geared toothed driven wheel; a plurality of detached complementary devices for operatively connecting said wheels at variable intervals, said devices having sections for engaging said wheels separately; and a plurality of independent spacing devices for feeding said complementary members to said wheels in spaced relation to register with said wheels, said spacing devices embodying rolling members having flanges corresponding in diameter with the pitch of the teeth of said driving wheel.

6. A mechanical movement embodying a plurality of geared toothed transmission members embodying a driving wheel and a driven wheel, said wheels being disposed in disengaged arrangement; and a belt of complementary connecting devices adapted for operatively connecting said driving and driven wheels, said belt embodying a number of independent connecting devices and spacing devices which do not connect, said devices being in excess of the number of teeth in said driving wheel.

7. A mechanical movement comprising a gear toothed driving member; a gear toothed driven member disposed in engaging relation to said driving member and normally disengaged therefrom; means for temporarily operatively connecting said driving and driven members, said means embodying a plurality of complementary members for engaging both the driving and driven members, and spacing members for separating said complementary members, a magazine track for delivering said complementary and spacing members to said driving wheels; and means for retaining the complementary and spacing members in said driving member for repeating the driving effect upon the driven member.

8. A mechanical movement comprising a gear toothed driving member; a gear toothed driven member disposed in engaging relation to said driving member and normally disengaged therefrom; means for temporarily operatively connecting said driving and driven members, said means embodying a plurality of complementary members for engaging both the driving and driven members, and spacing members for separating said complementary members, a magazine track for delivering said complementary and spacing members to said driving wheels; means for retaining the complementary and spacing members in said driving members for repeating the driving effect upon the driven member; and means for varying the duration of the engagement retention of said complementary and spacing members on said driving wheels.

9. A mechanical movement comprising a gear toothed driving member; a gear toothed driven member disposed in engaging relation to said driving member and normally disengaged therefrom; means for temporarily operatively connecting said driving and driven members, said means embodying a plurality of complementary members for engaging both the driving and driven members, and spacing members for separating said complementary members, a magazine track for delivering said complementary and spacing members to said driving wheels; means for retaining the complementary and spacing members in said driving member for repeating the driving effect upon the driven member; and means for varying the duration of the engagement retention of said complementary and spacing members on said driving wheels, said means embodying devices for holding said complementary members in service relation to said driving wheels.

10. A mechanical movement comprising a gear toothed driving member; a gear toothed driven member disposed in engaging relation to said driving member and normally disengaged therefrom; means for temporarily operatively connecting said driving and driven members, said means embodying a plurality of complementary members for engaging both the driving and driven members, and spacing members for separating said complementary members, a magazine track for delivering said complementary and spacing members to said driving wheels; means for retaining the complementary and spacing members in said driving member for repeating the driving effect upon the driven member; and means for varying the duration of the engagement retention of said complementary and spacing members on said driving wheels, said means embodying a switch conforming to the diameter of said driving wheel for holding said complementary members on said driving wheel.

WALTER C. READ.